US011280213B2

(12) United States Patent  (10) Patent No.: US 11,280,213 B2
Lammers et al.  (45) Date of Patent: Mar. 22, 2022

(54) FLUID SUPPLY LINE LEAKAGE DETECTION SYSTEM AND METHOD

(71) Applicant: General Electric Company, Schenectady, NY (US)

(72) Inventors: John Thomas Lammers, West Chester, OH (US); Philip Allen Najlepszy, Montgomery, OH (US); Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 15/491,027

(22) Filed: Apr. 19, 2017

(65) Prior Publication Data

US 2018/0306052 A1  Oct. 25, 2018

(51) Int. Cl.
*F01D 21/00* (2006.01)
*F02C 9/18* (2006.01)
(Continued)

(52) U.S. Cl.
CPC ........... *F01D 21/003* (2013.01); *F01D 17/08* (2013.01); *F02C 6/08* (2013.01); *F02C 9/18* (2013.01);
(Continued)

(58) Field of Classification Search
CPC .......... F01D 21/003; F01D 17/08; F02C 6/08; F02C 9/18; F05D 2270/3015; F05D 2260/80; F02K 3/06
(Continued)

(56) References Cited

U.S. PATENT DOCUMENTS 3,186,214 A * 6/1965 Roberts ................. G01M 3/226
137/240
5,065,350 A * 11/1991 Fedder ................ G01M 3/3263
702/51
(Continued)

FOREIGN PATENT DOCUMENTS

CA  2762868 A1  6/2012
CN  101718611 A  6/2010
(Continued)

OTHER PUBLICATIONS

Chinese Office Action and Search Report Corresponding to Application No. 201810356825 dated Oct. 8, 2019.
(Continued)

*Primary Examiner* — Marrit Eyassu
(74) *Attorney, Agent, or Firm* — Dority & Manning, P.A.

(57) ABSTRACT

A system and method for determining leakage in a fluid supply line assembly are provided. The system includes a source of pressurized fluid, a pressurized fluid load, and a fluid supply line coupled to the source and the load. The leak detection system also includes a source isolation valve configured to control a flow of fluid into the fluid supply line from the source, a load isolation valve configured to control a flow of fluid from the fluid supply line to the pressurized fluid load, and a processor communicatively coupled to a memory device. The memory device includes instructions that when executed by the processor, cause the processor to close the load isolation valve and open the source isolation valve to supply pressurized fluid to the fluid supply line, and after a predetermined interval, determine a leakage of pressurized fluid from the fluid supply line.

16 Claims, 4 Drawing Sheets

(51) Int. Cl.
  *F02K 3/06* (2006.01)
  *F02C 6/08* (2006.01)
  *F01D 17/08* (2006.01)

(52) U.S. Cl.
  CPC ............ *F02K 3/06* (2013.01); *F05D 2260/80* (2013.01); *F05D 2270/3015* (2013.01)

(58) Field of Classification Search
  USPC ............................................................ 73/40
  See application file for complete search history.

(56) References Cited

U.S. PATENT DOCUMENTS

| | | | |
|---|---|---|---|
| 5,397,181 A | 3/1995 | McNulty | |
| 5,852,929 A * | 12/1998 | Kato | F02B 77/08 60/274 |
| 6,435,010 B1 * | 8/2002 | Johnson | G01M 3/3236 73/40 |
| 6,549,857 B2 * | 4/2003 | Fierro | G01M 3/2815 702/138 |
| 6,948,325 B1 * | 9/2005 | Axe | B64D 13/06 62/127 |
| 7,328,098 B1 | 2/2008 | VanderLeest et al. | |
| 7,945,414 B2 * | 5/2011 | Nagase | G01F 1/42 340/611 |
| 8,250,906 B2 * | 8/2012 | Johnson | E03D 1/00 73/40 |
| 8,371,162 B2 | 2/2013 | Miranda et al. | |
| 8,919,485 B2 * | 12/2014 | Asai | B62M 1/10 180/302 |
| 9,464,534 B2 | 10/2016 | Reed et al. | |
| 9,476,361 B2 | 10/2016 | Morgan et al. | |
| 9,506,424 B2 | 11/2016 | Siering | |
| 9,541,467 B2 | 1/2017 | McCollum et al. | |
| 10,487,749 B2 * | 11/2019 | Bewick | G01M 3/2876 |
| 2004/0099048 A1 * | 5/2004 | Miura | G01M 3/3236 73/49.2 |
| 2004/0200460 A1 * | 10/2004 | Mitani | F02M 25/0818 123/520 |
| 2007/0125164 A1 * | 6/2007 | Zielinski | A62B 27/00 73/167 |
| 2008/0090510 A1 * | 4/2008 | Scherer | B64D 13/06 454/71 |
| 2013/0061740 A1 | 3/2013 | Asai | |
| 2014/0336872 A1 | 11/2014 | Howard | |
| 2015/0226129 A1 | 8/2015 | Byrd et al. | |
| 2015/0337679 A1 * | 11/2015 | Everwyn | F01D 17/085 415/1 |
| 2016/0032841 A1 * | 2/2016 | Ronan | F02C 7/32 415/121.3 |
| 2016/0061685 A1 * | 3/2016 | Ishida | F23K 5/007 73/40.5 R |
| 2016/0305336 A1 | 10/2016 | Okada | |
| 2016/0369705 A1 * | 12/2016 | Mackin | F02C 6/08 |

FOREIGN PATENT DOCUMENTS

| | | |
|---|---|---|
| CN | 102207417 A | 10/2011 |
| CN | 203132801 U | 8/2013 |
| CN | 205157143 U | 4/2016 |
| GB | 2522925 A | 8/2015 |

OTHER PUBLICATIONS

Chinese Office Action and Search Report Corresponding to Application No. 201810356825 dated Jul. 23, 2020.

* cited by examiner

FLUID SUPPLY LINE LEAKAGE DETECTION SYSTEM AND METHOD

BACKGROUND

The field of the disclosure relates generally to gas turbine engines and, more particularly, to a method and system for detecting leakage in fluid supply lines in gas turbine engines.

At least some known aircraft engines provide the aircraft with compressor bleed flow using a bleed air system. One potential problem associated with the bleed air system is line leakage between the engine and the aircraft pressure regulating shutoff valve (PRSOV). Typically, line leakage is detected after the bleed air leaking into an undercowl area of the engine increases undercowl temperatures sufficiently to set off a localized detection system, such as, a high temperature detection system. Moreover, the local detection systems are designed to detect high temperatures of specific components or undercowl areas and are not particularly effective at detecting leaks that do not affect these specific components or areas.

BRIEF DESCRIPTION

In one embodiment, a fluid supply line leak detection system includes a source of pressurized fluid, a pressurized fluid load, and a fluid supply line coupled in flow communication to the source of pressurized fluid and the pressurized fluid load. The fluid supply line leak detection system also includes a source isolation valve configured to control a flow of pressurized fluid into the fluid supply line from the source of pressurized fluid, a load isolation valve configured to control a flow of pressurized fluid from the fluid supply line to the pressurized fluid load, and a processor communicatively coupled to a memory device. The memory device includes instructions that when executed by the processor, cause the processor to close the load isolation valve and open the source isolation valve to supply pressurized fluid to the fluid supply line, and after a predetermined interval, determine a leakage of pressurized fluid from the fluid supply line.

Optionally, the instructions cause the processor to monitor a flow of pressurized fluid into the fluid supply line using a flow sensor and identify a leakage event when the monitored flow exceeds a predetermined threshold range. The instructions may also cause the processor to identify a leakage event when the monitored flow is maintained greater than a predetermined threshold range for a predetermined time period. Also optionally, the instructions cause the processor to determine a leakage of pressurized fluid from the fluid supply line using a virtual flow sensor. The instructions may also cause the processor to close the source isolation valve, monitor a pressure in the fluid supply line between the source isolation valve and the load isolation valve, and identify a leakage event when the monitored pressure decreases below a predetermined threshold range. The predetermined interval may be a predetermined time interval, and/or may be an interval required for the source of pressurized fluid to generate a predetermined amount of pressure.

In another embodiment, a method for determining leakage in a fluid supply line assembly is implemented using a controller coupled to a memory device. The method includes closing an load isolation valve from the fluid supply line assembly, opening a source isolation valve to the fluid supply line assembly, pressurizing the fluid supply line assembly through the open source isolation valve, and determining a leakage from the fluid supply line assembly based on at least one of a determined flow into the fluid supply line assembly and a determined pressure in the fluid supply line assembly.

Optionally, the method includes closing a load isolation valve from the fluid supply line assembly to a pressurized fluid load of the fluid supply line assembly. The method could also optionally include opening the source isolation valve to the fluid supply line assembly after a pressure of fluid from the source isolation valve is within a predetermined pressure range. Optionally, the method includes monitoring a flow of fluid into the fluid supply line assembly. The method also optionally includes indicating a leakage event when the flow of fluid remains above a predetermined threshold range for greater than a predetermined period of time. The method could also include closing the source isolation valve, monitoring a pressure of the fluid supply line assembly and indicating a leakage event when the pressure of fluid in the fluid supply line assembly decreases below a predetermined threshold range for greater than a predetermined period of time. Optionally, the method also includes generating a predetermined amount of pressure in the source of pressurized fluid before opening the source isolation valve.

In yet another embodiment, one or more non-transitory computer-readable storage media include computer-executable instructions embodied thereon. When executed by at least one processor, the computer-executable instructions cause the processor to close an load isolation valve from the fluid supply line assembly, opening a source isolation valve to the fluid supply line assembly, pressurize the fluid supply line assembly through the open source isolation valve, and determine a leakage from the fluid supply line assembly based on at least one of a determined flow into the fluid supply line assembly and a determined pressure in the fluid supply line assembly.

Optionally, the computer-executable instructions further cause the processor to close a load isolation valve from the fluid supply line assembly to a pressurized fluid load of the fluid supply line assembly. Also optionally, the computer-executable instructions further cause the processor to open the source isolation valve to the fluid supply line assembly after a pressure of fluid from the source isolation valve is within a predetermined pressure range. The computer-executable instructions may further cause the processor to monitor a flow of fluid into the fluid supply line assembly. Optionally, the computer-executable instructions further cause the processor to indicate a leakage event when the flow of fluid remains above a predetermined threshold range for greater than a predetermined period of time. Additionally, the computer-executable instructions further may cause the processor to close the source isolation valve, monitor a pressure of the fluid supply line assembly, and indicate a leakage event when the pressure of fluid in the fluid supply line assembly decreases below a predetermined threshold range for greater than a predetermined period of time.

BRIEF DESCRIPTION OF THE DRAWINGS

FIG. 1 is a perspective view of an aircraft.

FIG. 2 is a schematic cross-sectional view of the gas turbine engine in accordance with an exemplary embodiment of the present disclosure.

FIG. 3 is a schematic diagram of a fluid supply line leak detection system that may be used with the engine and the aircraft shown in FIG. 1.

FIG. 4 is a flowchart of a method of determining leakage in the fluid supply line assembly shown in FIG. 3.

Figure 1:
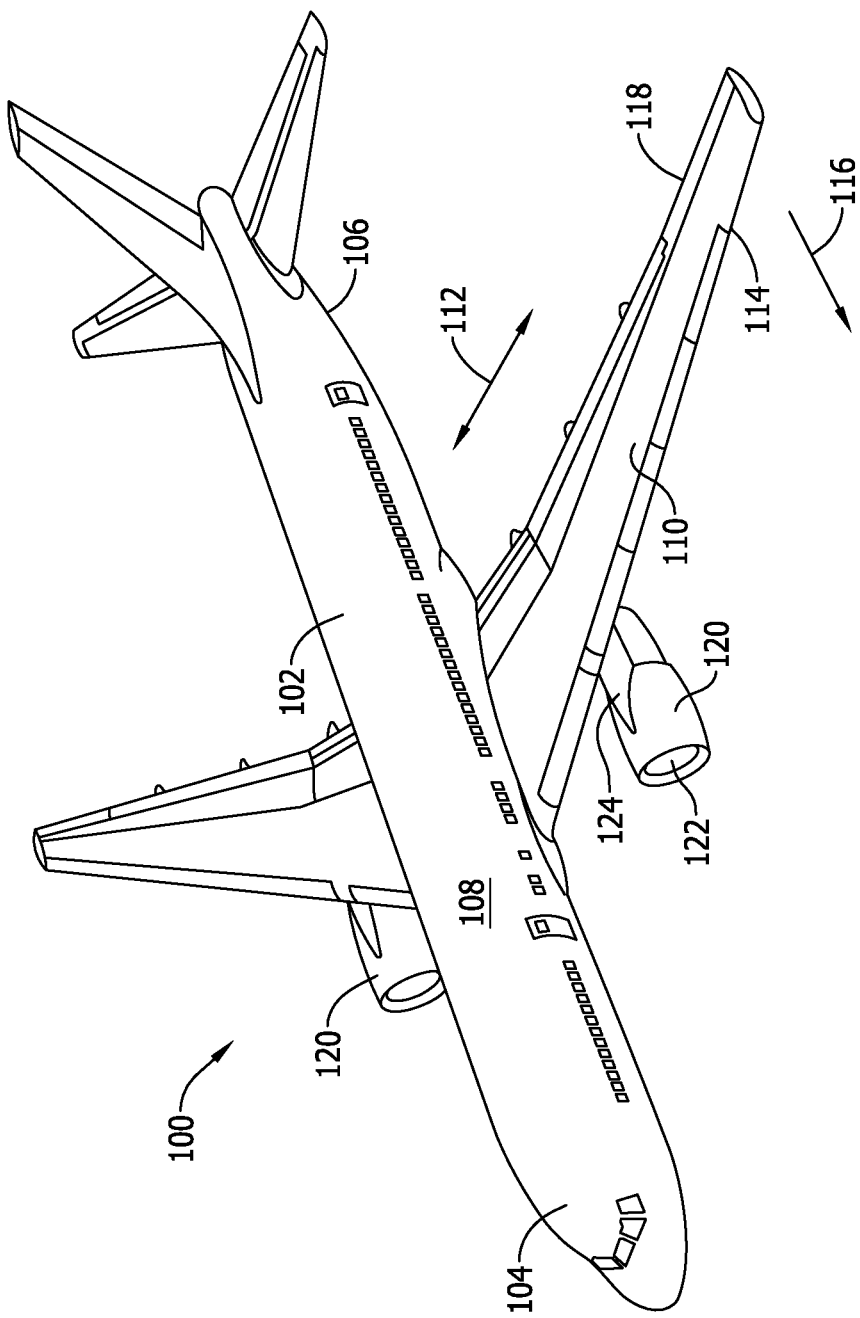
FIGS. 1-4 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to detecting leakage in fluid supply lines and other piping and similar systems in industrial, commercial, and residential applications.

Embodiments of a leakage detection system are described herein. The system and methods described provide an alternate means of leak detection using a sensor based algorithm that is capable of detecting broken lines or leaks throughout the entire bleed ducting from the bleed port to the pressure regulating shutoff valve (PRSOV). Computer logic is used to perform the compressor bleed air leak test upon reaching idle engine speed following an engine start. The system opens the engine controlled bleed valves while the aircraft (PRSOV) bleed valve remains closed. The result is that the fluid supply line between the engine and the PRSOV fills with compressor bleed air and no flow is expected, provided all ducting is intact. After the fluid supply lines are full, a bleed flow calculation is performed. If the calculated bleed flow is greater than zero plus an accuracy stack, then a broken or leaking line is detected. Accordingly, a simpler and more complete method of detecting compressor bleed air leaks between the engine and the PRSOV than existing, localized detection methods is provided.

Existing detection methods, such as fire loops and temperature sensors, provide localized detection of high undercowl temperatures. However, the detection method described herein provides continuous detection capability throughout all ducting between the engine and PRSOV. Running a leak test in a controlled environment (engine valves open, PRSOV closed) provides clear pass/fail criteria (zero expected flow) allowing hardware and logic to be leveraged in the detection algorithm without having to improve upon the accuracy of the system. Moreover, the low expected bleed flow (approximately zero flow) permits the detection threshold to be tuned to one condition rather than many conditions. Doing so allows existing hardware and software to be leveraged, minimizing cost and weight required to detect compressor bleed air leaks.

The following description refers to the accompanying drawings, in which, in the absence of a contrary representation, the same numbers in different drawings represent similar elements.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one gas turbine engine 120 configured to drive a bladed rotatable member 122 or fan to generate thrust. At least one gas turbine engine 120 is connected to an engine pylon 124, which may connect the at least one gas turbine engine 120 to aircraft 100. Engine pylon 124, for example, may couple at least one gas turbine engine 120 to at least one of wing 110 and fuselage 102, for example, in a pusher configuration (not shown) proximate tail 106.

Figure 2:
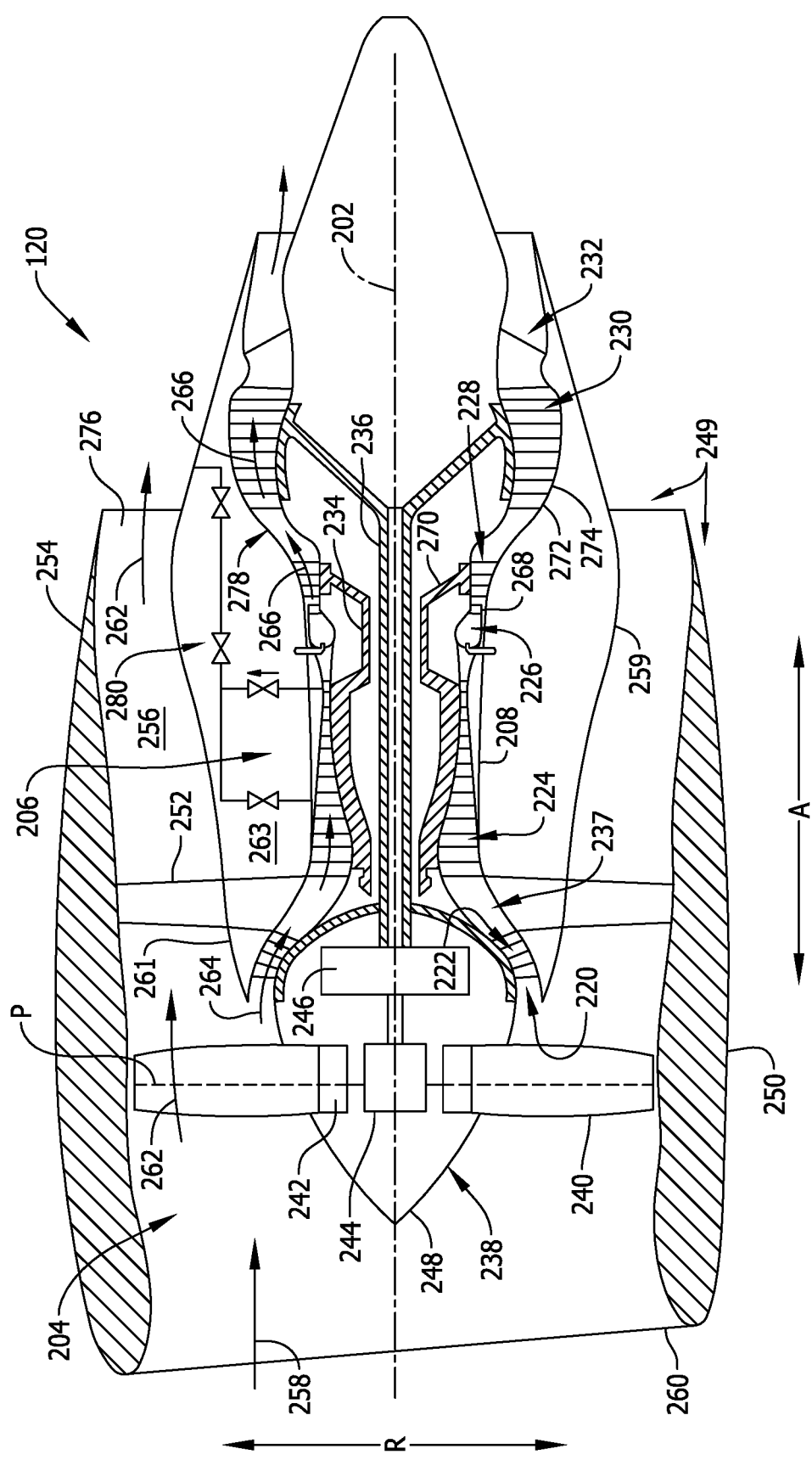

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, gas turbine engine 120 defines an axial direction A (extending parallel to a longitudinal axis 202 provided for reference) and a radial direction R. In general, gas turbine engine 120 includes a fan assembly 204 and a core engine 206 disposed downstream from fan assembly 204.

In the example embodiment, core engine 206 includes an approximately tubular engine casing 208 that defines an annular core engine inlet 220. Engine casing 208 encases, in serial flow relationship, a compressor section including a booster or low pressure compressor (LPC) 222 and a high pressure compressor (HPC) 224, a combustor 226, a turbine section including a high pressure turbine (HPT) 228 and a low pressure turbine (LPT) 230, and a jet exhaust nozzle 232. A high pressure (HP) spool or shaft 234 drivingly connects HPT 228 to HPC 224. A low pressure (LP) spool or shaft 236 drivingly connects LPT 230 to LPC 222. The compressor section, combustor 226, turbine section, and jet exhaust nozzle 232 together define a core engine air flowpath 237.

In the example embodiment, fan assembly 204 includes a variable pitch fan 238 having a plurality of fan blades 240 coupled to a fan disk 242 in a spaced apart relationship. Fan blades 240 extend radially outwardly from fan disk 242. Each fan blade 240 is rotatable relative to fan disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 is configured to collectively vary the pitch of fan blades 240 in unison. Fan blades 240, fan disk 242, and pitch change mechanism (PCM) 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Fan disk 242 is covered by rotatable front hub 248 aerodynamically contoured to promote an airflow through the plurality of fan blades 240. Additionally, fan assembly 204 and at least a portion of core engine 206 are surrounded by a nacelle assembly 249, which may include an annular fan casing or outer nacelle 250 that circumferentially surrounds fan 238 and/or at least a portion of core engine 206. In the example embodiment, outer nacelle 250 is configured to be supported relative to core engine 206 by a plurality of circumferentially-spaced outlet guide vanes 252. Moreover, a downstream section 254 of outer nacelle 250 may extend over an outer portion of core engine 206 so as to define a bypass duct 256 therebetween.

Nacelle assembly 249 is a system of components or structures attached to gas turbine engine 120 and/or engine pylon 124 (shown in FIG. 1), which provides aerodynamic surfaces around gas turbine engine 120, defines an annular core engine inlet 220 for core engine flow portion 264 and defines a path for bypass flow portion 262, defines appropriate nozzles for the exhaust of bypass duct 256 and a core engine exhaust 257, and houses or contains auxiliary devices for the engine and other components for the aircraft including various ducts, lines, pipes and wires. Nacelle assembly 249 may be subdivided into outer nacelle 250 and an inner nacelle 259 generally separated by bypass duct 256. Outer nacelle 250 may include an inlet opening 260, which generally overlaps the fan case of gas turbine engine 120. Outer nacelle 250 may also partially overlap a forward portion 261 of inner nacelle 259 with outer nacelle 250 providing a radially outer wall for bypass duct 256 and inner nacelle 259 providing a radially inner wall.

Inner nacelle 259 forms at least a part of a generally cylindrical or barrel-shaped cowl formed around the engine casing 208 and helps define an engine core compartment 263. Inner nacelle 259 houses and is configured to provide an aerodynamic cover for engine casing 208.

During operation of gas turbine engine 120, a volume of air 258 enters gas turbine engine 120 through associated inlet opening 260 of outer nacelle 250 and/or fan assembly 204. As volume of air 258 passes across fan blades 240, a bypass flow portion 262 of volume of air 258 is directed or routed into bypass duct 256 and a core engine flow portion 264 of volume of air 258 is directed or routed into core engine air flowpath 237, or more specifically into LPC 222. A ratio between bypass flow portion 262 and core engine flow portion 264 is commonly referred to as a bypass ratio. The pressure of core engine flow portion 264 is then increased as it is routed through HPC 224 and into combustor 226, where it is mixed with fuel and burned to provide combustion gases 266.

Combustion gases 266 are routed through HPT 228 where a portion of thermal and/or kinetic energy from combustion gases 266 is extracted via sequential stages of HPT stator vanes 268 that are coupled to engine casing 208 and HPT rotor blades 270 that are coupled to HP shaft 234, thus causing HP shaft 234 to rotate, which then drives a rotation of HPC 224. Combustion gases 266 are then routed through LPT 230 where a second portion of thermal and kinetic energy is extracted from combustion gases 266 via sequential stages of LPT stator vanes 272 that are coupled to engine casing 208 and LPT rotor blades 274 that are coupled to LP shaft 236, which drives a rotation of LP shaft 236 and LPC 222 and/or rotation of fan 238.

Combustion gases 266 are subsequently routed through jet exhaust nozzle 232 of core engine 206 to provide propulsive thrust. Simultaneously, the pressure of bypass flow portion 262 is substantially increased as bypass flow portion 262 is routed through bypass duct 256 before it is exhausted from a fan nozzle exhaust 276 of gas turbine engine 120, also providing propulsive thrust. HPT 228, LPT 230, and jet exhaust nozzle 232 at least partially define a hot gas path 278 for routing combustion gases 266 through core engine 206. A fluid supply line assembly 280 is coupled in flow communication between one or more stages of HPC 224 and a pressurized fluid load 304 (shown in FIG. 3) onboard aircraft 100 (shown in FIG. 1).

Gas turbine engine 120 is depicted in the figures by way of example only, in other exemplary embodiments, gas turbine engine 120 may have any other suitable configuration including for example, a turboprop engine, a military purpose engine, and a marine or land-based aero-derivative engine.

Figure 3:
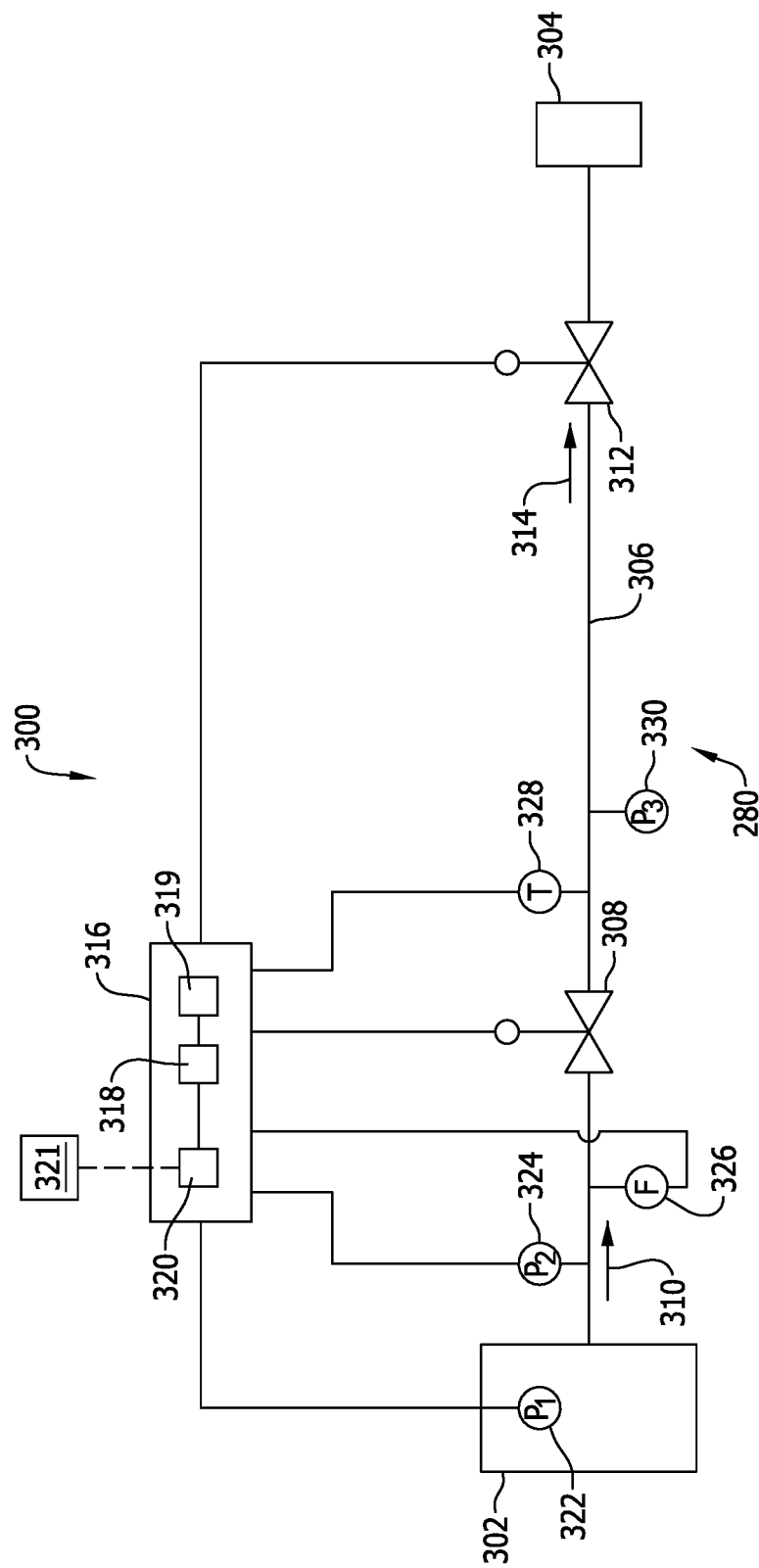

FIG. 3 is a schematic diagram of a fluid supply line leak detection system 300 that may be used with gas turbine engine 120 and aircraft 100 (shown in FIG. 1). In the example embodiment, fluid supply line leak detection system 300 includes a source 302 of pressurized fluid, pressurized fluid load 304, and a fluid supply line 306 coupled in flow communication to source 302 and pressurized fluid load 304. Source 302 may be embodied in a bleed from a compressor, such as, but not limited to at least one of HPC 224 and LPC 222 (shown in FIG. 2). Pressurized fluid load 304 may be embodied in, for example, an aircraft air supply system or air management system (AMS). A source isolation valve 308 may be configured to control a flow 310 of pressurized fluid into fluid supply line 306 from source 302. In some embodiments, source isolation valve 308 is a bi-position valve having open and closed positions. In other embodiments, source isolation valve 308 is a modulating valve configured to be positionable in a plurality of intermediate positions between fully open and fully closed. A load isolation valve 312 is configured to control a flow 314 of pressurized fluid from fluid supply line 306 to pressurized fluid load 304. In some embodiments, load isolation valve 312 is a bi-position valve having open and closed positions. In other embodiments, load isolation valve 312 is a modulating valve configured to be positionable in a plurality of intermediate positions between fully open and fully closed.

Fluid supply line leak detection system 300 includes a computer device, such as, but not limited to controller 316 having a processor 318 communicatively coupled to a memory device 319 that stores a computer program or computer-readable instructions that when executed by processor 318, causes processor 318 to implement steps to carry out a leak detection procedure. Memory device 319 may include a database that includes look-up tables, data defining models of gas turbine engine 120, or other information used by controller 316 and/or processor 318.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Processor 318 is operatively coupled to a communication interface 320 such that a maintenance computer system 321 is capable of communicating with processor 318. For example, communication interface 320 may receive requests from maintenance computer system 321 for data stored in memory device 319 or may transmit instructions or commands to memory device 319 via a temporary wired connection, a wireless connection, and/or over a network, such as, but not limited to a local area network (LAN) or the Internet.

Memory device 319 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Fluid supply line leak detection system 300 also includes various sensors that are relied upon to carry out the leak detection procedure. For example, in the example embodiment, a first pressure sensor 322 and a second pressure sensor 324 are used to provide flow and/or pressure signals to controller 316. In addition, a flow sensor 326, a temperature sensor 328, and/or a third pressure sensor 330 may be used to facilitate determining the occurrence of a leakage event. First pressure sensor 322 and second pressure sensor 324 may be used together to generate a differential pressure signal, which may be used to generate a flow signal for flow entering fluid supply line 306 from source 302. Alternatively or in addition, flow sensor 326 can be used to determine the flow into fluid supply line 306 from source 302 directly. Third pressure sensor 330 and temperature sensor 328 can also be used to determine a leakage event. Once fluid supply line 306 is pressurized, source isolation valve 308 may be closed, trapping a pressurized volume of fluid between load isolation valve 312 and source isolation valve 308 in fluid supply line 306. The signal from third pressure sensor 330 can then be monitored for a decrease which would indicate a leak in fluid supply line 306. Temperature sensor 328 can be used to correct the pressure signal from third pressure sensor 330 to account for pressure changes in fluid supply line 306 due to temperature changes.

In the exemplary embodiment, sensors 322, 324, 326, 328, and 330 may be communicatively coupled to controller 316 using hard wire conduits and/or wireless communications. At least some of sensors 322, 324, 326, 328, and 330 may be "virtual sensors". As used herein, "virtual sensors" are software constructs that receive input from one or more physical sensors and use such inputs to compute a process parameter at a location of the virtual sensor where a physical sensor for that parameter does not exist, is not practical, or has become inoperable. For example, flow sensor 326 can be a virtual sensor that uses sensed rotor speeds, pressures, temperatures, and actuator positions throughout the gas turbine engine 120 with, for example, a physics based model, a regression based model or another model of gas turbine engine 120 to determine an estimated airflow in real-time or near real-time.

As used herein, real-time refers to outcomes occurring at a substantially short period after a change in the inputs affecting the outcome, for example, receiving a change in a pressure signal from a pressure sensor at nearly the same time the actual parameter has changed. The period is the amount of time between each iteration of a regularly repeated task or between one task and another such as, updating of a sensor output or an update to a database where a sensor value is stored. The time period is a result of design parameters of the real-time system that may be selected based on the importance of the outcome and/or the capability of the system implementing processing of the inputs to generate the outcome. Additionally, events occurring in real-time occur without substantial intentional delay.

During operation, processor 318 is programmed to close load isolation valve 312 and open source isolation valve 308 to supply a flow 310 of pressurized fluid to fluid supply line 306 and after a predetermined interval, determine a leakage of pressurized fluid from fluid supply line 306. Leakage may be detected by monitoring flow 310 into fluid supply line 306 using a surrogate or virtual flow sensor, such as, first pressure sensor 322 and second pressure sensor 324, and/or directly using flow sensor 326. Any flow above zero flow indicates a leak in fluid supply line 306, however a threshold range may be set higher to account for inconsequential leakage and/or measurement accuracy or errors that could lead to false positive indications of leakage. Because flow 310 is present while fluid supply line 306 is pressurizing, a time delay may be used to delay a determination of flow for leakage purposes.

Another procedure for determine a leakage event may involve closing source isolation valve 308 after fluid supply line 306 is pressurized and monitoring a pressure in fluid supply line 306 while it is isolated. With no leakage in fluid supply line 306, the pressure in fluid supply line 306 should remain constant after source isolation valve 308 is closed. A decrease in the corrected pressure indicates a leak in fluid supply line 306.

Figure 4:
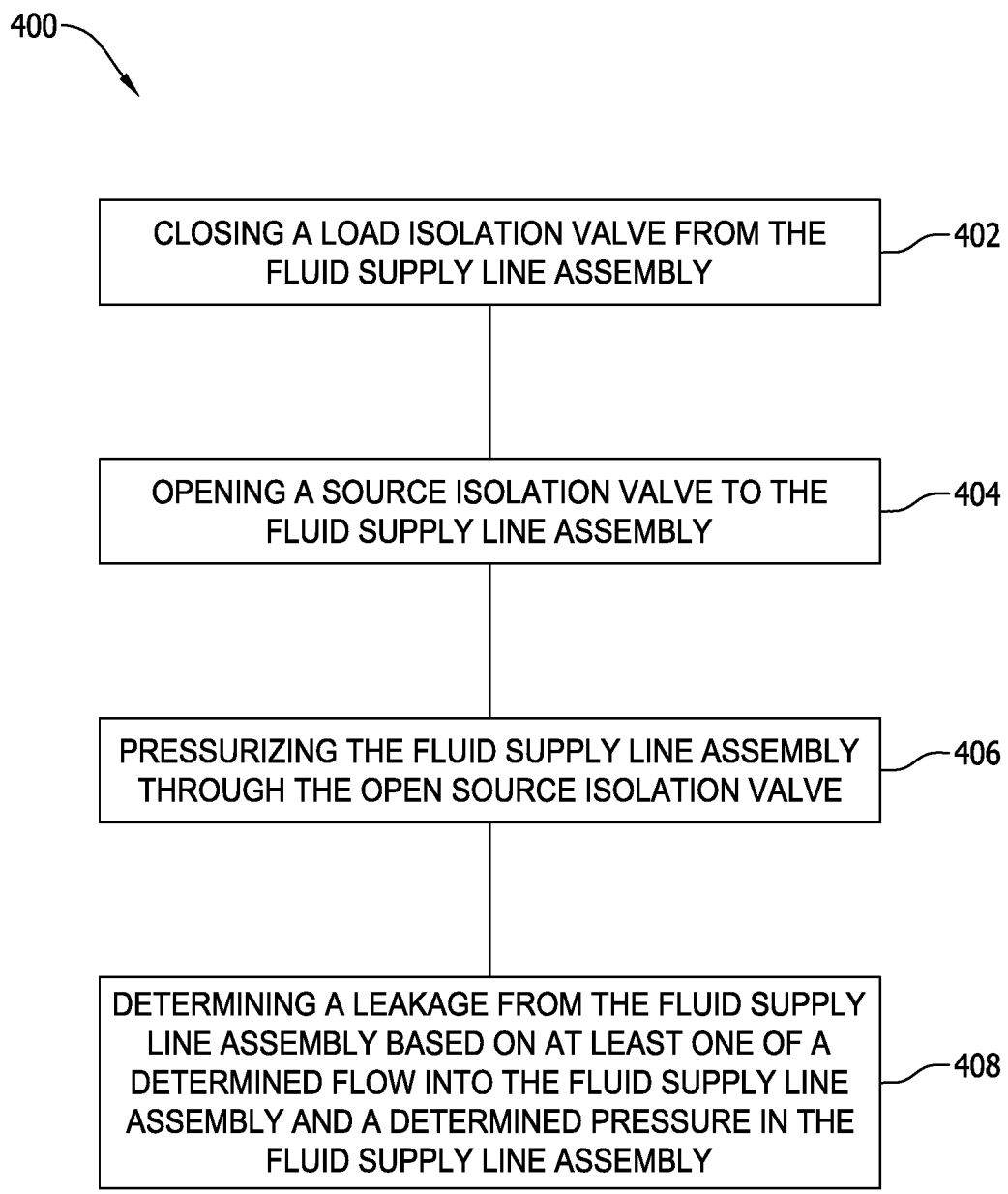

FIG. 4 is a flowchart of a method 400 of determining leakage in a fluid supply line assembly. In various embodiments, method 400 is implemented using a controller coupled to a memory device. Method 400 includes closing 402 a load isolation valve from the fluid supply line assembly, opening 404 a source isolation valve to the fluid supply line assembly, pressurizing 406 the fluid supply line assembly through the open source isolation valve, and determining 408 a leakage from the fluid supply line assembly based on at least one of a determined flow into the fluid supply line assembly and a determined pressure in the fluid supply line assembly.

Method 400 also may include opening the source isolation valve to the fluid supply line assembly after a pressure of fluid from the source isolation valve is within a predetermined pressure range. In some embodiments, method 400 includes monitoring a flow of fluid into the fluid supply line assembly to determine the leakage from the fluid supply line assembly. Method 400 also includes indicating a leakage event when the flow of fluid remains above a predetermined threshold range for greater than a predetermined period of time. Method 400 may also include closing the source isolation valve, monitoring a pressure of the fluid supply line assembly, and indicating a leakage event when the pressure of fluid in the fluid supply line assembly decreases below a predetermined threshold range for greater than a predetermined period of time.

In various embodiments of the present disclosure, a computer program is provided, and the program is embodied on a computer readable medium. In the example embodiment, the leakage detection system is executed on a single computer system, without requiring a connection to a server or auxiliary computer. The application is flexible and designed to run in various different environments without compromising any major functionality. In some embodiments, the leakage detection system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

The above-described leak detection systems provide an efficient method for periodically automatically checking fluid supply line assemblies and piping systems for leakage. Specifically, the above-described leak detection system includes installed components and a novel procedure for detecting leaks in the fluid supply line assembly.

An exemplary technical effect of the methods, systems, and apparatus described herein includes at least one of: (a) determining a leakage from a fluid supply line assembly based on at least one of a determined flow into the fluid supply line assembly and a determined pressure in the fluid supply line assembly, (b) detecting a leak in an aircraft fluid supply line using engine bleed valves open and the aircraft isolation valve closed and measured flow is greater than zero, (c) selecting an algorithm to determine a corrected leakage rate; and (d) receiving parameters from offboard the aircraft or engine wirelessly, by temporary connection, or by a permanent hardwired connection.

The above-described embodiments of a supply line leak detection system provide an automatic method of determining a leakage integrity of a fluid supply line prior to use. More specifically, the methods and systems described herein facilitate using installed components to implement the leakage detection method automatically. As a result, the methods and systems described herein facilitate reducing out of service time and maintenance effort of gas turbine engine fluid supply systems in a cost-effective and reliable manner.

Exemplary embodiments of fluid supply line leak detection systems are described above in detail. The leak detection systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring a flow of pressurized fluid from a source of such fluid to a pressurized fluid load configured to consume the pressurized fluid, and are not limited to practice with only the systems and methods as described herein. Rather, the exemplary embodiment can be implemented and utilized in connection with many other machinery applications that are currently configured to receive and accept fluid supply line assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for determining leakage in a fluid supply line assembly, the method implemented using a controller coupled to a memory device, the method comprising:
    closing a load isolation valve from the fluid supply line assembly, wherein the load isolation valve is a pressure regulating shutoff valve of a gas turbine engine for an aircraft;
    opening a source isolation valve to the fluid supply line assembly, wherein the source isolation valve is a bleed valve of the gas turbine engine;
    receiving a pressure signal from a first pressure sensor positioned upstream of the source isolation valve, the pressure signal received from the first pressure sensor being indicative of a pressure of a flow of pressurized fluid flowing into the fluid supply line;

receiving a pressure signal from a second pressure sensor positioned along the fluid supply line and upstream of the source isolation valve, the pressure signal received from the second pressure sensor being indicative of a pressure of the flow of pressurized fluid flowing along the fluid supply line upstream of the source isolation valve;

generating a flow signal indicative of the flow of pressurized fluid entering the fluid supply line based at least in part on the pressure signal received from the first pressure sensor and the pressure signal received from the second pressure sensor; and determining a leakage of pressurized fluid from the fluid supply line based at least in part on the flow signal.

2. The method of claim 1, wherein opening the source isolation valve to the fluid supply line assembly comprises opening the source isolation valve to the fluid supply line assembly after the pressurized fluid from the source isolation valve is within a predetermined pressure range.

3. The method of claim 1, wherein the source isolation valve is configured to selectively provide a bleed from a compressor.

4. The method of claim 1, further comprising:
starting a gas turbine engine having the fluid supply line assembly;
idling the gas turbine engine, and
wherein the method is performed during idling the gas turbine engine.

5. One or more non-transitory computer-readable storage media having computer-executable instructions embodied thereon, wherein when executed by at least one processor, the computer-executable instructions cause the processor to:
close a load isolation valve from a fluid supply line assembly;
open a source isolation valve to the fluid supply line assembly;
pressurize the fluid supply line assembly through the open source isolation valve with a flow of pressurized fluid from a compressor;
receive a pressure signal from a first pressure sensor indicative of a pressure of the flow of pressurized fluid flowing into the fluid supply line from the compressor, the first pressure sensor being positioned upstream of the source isolation valve;
receive a pressure signal from a second pressure sensor indicative of the pressure of the flow of pressurized fluid flowing along the fluid supply line upstream of the source isolation valve, the second pressure sensor being positioned along the fluid supply line upstream of the source isolation valve;
generate a flow signal indicative of the flow of pressurized fluid entering the fluid supply line from the compressor based at least in part on the pressure signal received from the first pressure sensor and the pressure signal received from the second pressure sensor; and
after a predetermined interval, determine a leakage from the fluid supply line assembly based at least in part on the flow signal.

6. The computer-readable storage media of claim 5, wherein the computer-executable instructions further cause the processor o close the load isolation valve from the fluid supply line assembly to a pressurized fluid load of the fluid supply line assembly.

7. The computer-readable storage media of claim 5, wherein the computer-executable instructions further cause the processor to open the source isolation valve to the fluid supply line assembly after a pressure of fluid from the source isolation valve is within a predetermined pressure range.

8. The computer-readable storage media of claim 5, wherein the computer-executable instructions further cause the processor to monitor a flow of fluid into the fluid supply line assembly.

9. The computer-readable storage media of claim 5, wherein the computer-readable storage media is a component of a controller for a gas turbine engine.

10. The computer-readable storage media of claim 5, wherein the computer-executable instructions further cause the processor to:
close the source isolation valve;
monitor the pressure of the fluid supply line assembly; and
indicate a leakage event when the pressure of fluid in the fluid supply line assembly decreases below a predetermined threshold range for greater than a predetermined period of time.

11. A gas turbine engine for an aircraft, comprising:
a compressor;
a pressurized fluid load configured as an aircraft air supply system;
a fluid supply line having a plurality of ducts providing flow communication between said compressor and said pressurized fluid load;
a source isolation valve configured to control a flow of pressurized fluid into said plurality of ducts of the fluid supply line from said compressor, wherein said source isolation valve is a bleed valve of the gas turbine engine;
a load isolation valve configured to control a flow of pressurized fluid from said plurality of ducts of said fluid supply line to said pressurized fluid load, wherein the load isolation valve is a pressure regulating shutoff valve;
a first pressure sensor positioned upstream of the source isolation valve and configured to measure a pressure of the flow of pressurized fluid flowing into said fluid supply line from said compressor;
a second pressure sensor positioned along the fluid supply line and upstream of the source isolation valve, the second pressure sensor configured to measure a pressure of the flow of pressurized fluid flowing along the fluid supply line; and
a processor communicatively coupled to a memory device including instructions that when executed by the processor, cause the processor to:
close said load isolation valve and open said source isolation valve to supply pressurized fluid to said fluid supply line so that each of the plurality of ducts are filled with pressurized fluid;
receive a pressure signal from the first pressure sensor indicative of the pressure of the flow of pressurized fluid flowing into said fluid supply line from said compressor;
receive a pressure signal from the second pressure sensor indicative of the pressure of the flow of pressurized fluid flowing along the fluid supply line upstream of the source isolation valve;
generate a flow signal indicative of the flow of pressurized fluid entering the fluid supply line from said compressor based at least in part on the pressure signal received from the first pressure sensor and the pressure signal received from the second pressure sensor; and after a predetermined interval, determine a leakage of pressurized fluid from said fluid supply line based at least in part on the flow signal.

12. The gas turbine engine of claim 11, wherein the source isolation valve is a bleed valve and the load isolation valve is a pressure regulating shutoff valve.

13. The gas turbine engine of claim 11, wherein the instructions cause the processor to:

close said source isolation valve;

monitor, by pressure signals received from a pressure sensor positioned between the source isolation valve and the load isolation valve along the fluid supply line, a pressure in said fluid supply line between said source isolation valve and said load isolation valve; and identify a leakage event when the monitored pressure decreases below a predetermined threshold range.

14. The gas turbine engine of claim 13, further comprising:

a temperature sensor positioned between the source isolation valve and the load isolation valve along the fluid supply line.

15. The gas turbine engine of claim 14, wherein the instructions cause the processor to:

correct the pressure signals received from the pressure sensor based on temperature signals received from the temperature sensor indicative of a temperature in said fluid supply line between said source isolation valve and said load isolation valve, wherein correction of the pressure signals accounts for changes in the pressure in said fluid supply line between said source isolation valve and said load isolation valve due to changes in the temperature in said fluid supply line between said source isolation valve and said load isolation valve.

16. The gas turbine engine of claim 11, wherein said predetermined interval is an interval required for said compressor to pressurize fluid to generate a predetermined amount of pressure.

* * * * *